US009011752B2

(12) United States Patent
Seppälä et al.

(10) Patent No.: US 9,011,752 B2

(45) Date of Patent: Apr. 21, 2015

(54) ELECTROMAGNETIC WAVE TRANSMISSION LINES USING MAGNETIC NANOPARTICLE COMPOSITES

(75) Inventors: Eira T. Seppälä, Helsinki (FI); Markku T. Heino, Espoo (FI); Reijo K. Lehtiniemi, Helsinki (FI); Markku A. Oksanen, Helsinki (FI)

(73) Assignee: Nokia Corporation, Espoo (FI)

( * ) Notice: Subject to any disclaimer, the term of this patent is extended or adjusted under 35 U.S.C. 154(b) by 1650 days.

(21) Appl. No.: 12/074,545

(22) Filed: Mar. 3, 2008

(65) Prior Publication Data

US 2010/0003503 A1 Jan. 7, 2010

(51) Int. Cl.

| | |
|---|---|
| ***B32B 5/16*** | (2006.01) |
| ***H01P 11/00*** | (2006.01) |
| ***H01P 3/08*** | (2006.01) |
| ***H01P 3/12*** | (2006.01) |
| ***H01P 3/16*** | (2006.01) |
| ***H01P 5/02*** | (2006.01) |

(52) U.S. Cl.

CPC ................ *H01P 11/001* (2013.01); *H01P 3/08* (2013.01); *H01P 3/121* (2013.01); *H01P 3/16* (2013.01); *H01P 5/02* (2013.01)

(58) Field of Classification Search

USPC .......................................................... 264/437

See application file for complete search history.

(56) References Cited

U.S. PATENT DOCUMENTS

| | | | | |
|---|---|---|---|---|
| 3,791,864 A | | 2/1974 | Steingroever | 117/238 |
| 4,158,862 A | | 6/1979 | Michaud et al. | 360/56 |
| 5,132,058 A | * | 7/1992 | Suyama et al. | 264/437 |
| 5,981,053 A | * | 11/1999 | Naylor et al. | 428/323 |
| 6,149,857 A | * | 11/2000 | McArdle et al. | 264/429 |
| 6,777,706 B1 | | 8/2004 | Tessler et al. | 257/17 |
| 7,072,565 B2 | | 7/2006 | Shelnut et al. | 385/143 |
| 2004/0164907 A1 | | 8/2004 | Killen et al. | |
| 2004/0202862 A1 | * | 10/2004 | Kazmaier et al. | 428/403 |
| 2005/0006727 A1 | | 1/2005 | Forbes et al. | |
| 2005/0239948 A1 | * | 10/2005 | Haik et al. | 524/496 |
| 2006/0281846 A1 | * | 12/2006 | Hager et al. | 524/430 |

FOREIGN PATENT DOCUMENTS

| | | |
|---|---|---|
| JP | 2002-107240 A | 4/2002 |
| JP | 2006-058831 A | 3/2006 |

OTHER PUBLICATIONS

Office Action for Chinese Application No. 200980113341.7; dated Dec. 26, 2012.

(Continued)

*Primary Examiner* — Larry Thrower

*Assistant Examiner* — Xue Liu

(74) *Attorney, Agent, or Firm* — Alston & Bird LLP

(57) ABSTRACT

The disclosure pertains to a method of orientating particles by their easy axes in a selected area of a composite comprising the particles dispersed in a matrix. The method comprises liquefying and then solidifying the matrix at the selected area while applying an external magnetic field on the composite. The composite can be used for a transmission line component for directing high frequency electromagnetic waves. The particles are preferably superparamagnetic nanocrystallite particles and matrix is preferably a polymeric material.

10 Claims, 5 Drawing Sheets

(56) References Cited

OTHER PUBLICATIONS

International Search Report and Written Opinion from International Application No. PCT/FI2009/050021, dated May 4, 2009.

"Phase alignment and crystal orientation of Al3Ni in Al—Ni alloy by imposition of a uniform high magnetic field", Science Direct, Journal of Crystal Growth 310 (Dec. 28, 2007), C. Wang et al., pp. 1256-1263.

* cited by examiner

ELECTROMAGNETIC WAVE TRANSMISSION LINES USING MAGNETIC NANOPARTICLE COMPOSITES

TECHNICAL FIELD

The disclosure relates to transmission lines, including waveguides, for directing high frequency electromagnetic waves. In particular, the present disclosure relates to a composite material medium suitable for directing radio and microwave frequency electromagnetic waves. Further, the present disclosure relates to a method for forming the transmission lines and waveguides composed of the composite material.

BACKGROUND ART

A transmission line is a material medium or structure that forms all or part of a path for directing the transmission of electromagnetic waves or acoustic waves. Typical transmission lines for transmitting high frequency electromagnetic waves include coaxial cables, microstrips, striplines, etc. A coaxial cable confines the electromagnetic wave to the area inside the cable between a center conductor and a shield. The dielectric material inside the cable is the medium for transmission of the wave energy. A microstrip consists of a conducting strip separated from a ground plane by a dielectric layer known as the substrate. A stripline is a strip of conductor surrounded by dielectric material and sandwiched between two parallel ground planes. High frequency electromagnetic waves travel within the transmission lines. An important factor of the transmission line is its characteristic impedance, which is determined by structure and physical dimensions of the transmission line, and physical properties of the dielectric medium, such as resistance, inductance and conductance. Particularly for microstrips and striplines, width of the strip, thickness of the dielectric material and relative permeability of the dielectric material determine the characteristic impedance.

Connecting different types of components or transmission lines having different impedance levels requires a transformer. In high frequency circuit design, transmission line transformers and other distributed components are commonly used. For a single-stage quarter wave transformer, the transformer impedance is the geometric mean between the impedance of a first component (such as a load) and a second component (such as a source):

$$Z_T=(Z_L*Z_S)\hat{}0.5$$

A multi-stage transformer may be formed by piling single-stage quarter-wave transformers in series. Each transformer section has an intermediate impedance. In the multi-stage transformer, the impedance mismatch between any two transformer sections is smaller than that between the component and the single stage transformer.

Characteristic impedance of a homogenous dielectric material for a certain electromagnetic wave frequency can be determined by conventional methods known in the art. In a composite material, which is an engineered material made from two or more constituent materials with significantly different physical or chemical properties and which remain separate and distinct on a macroscopic level within the finished structure, the overall characteristic impedance depends on the contributions of the individual constituent materials or components. For example, if a composite comprises a homogenous matrix and ultra-fine nanoscale particles, the characteristic impedance of the composite may be influenced by the added particles.

Composite materials containing nanoscale particles are known in the art and they have numerous applications. U.S. Pat. No. 4,158,862 discloses a method for producing permanent magnetic recordings. The method comprises the steps of: (a) coating a support (substrate) with a polymerizable magnetic ink which contains ferromagnetic particles in a polymer solution; (b) while the ink is still fluid, subjecting the magnetic ink to a magnetic field to orient the magnetic particles contained in the ink in a predetermined direction; and (c) selectively polymerizing, by irradiation, certain areas of the magnetic ink coating corresponding to parts of the recorded message which are to have the magnetic orientation imposed in step (b). As the result, the cured coating layer contains magnetic particles aligned in a direction that is determined by the external magnetic field.

U.S. Pat. No. 3,791,864 describes fabrication of decorative patterns by melting a surface comprising magnetic particles, applying a magnetic field to produce the pattern, and then allowing the surface to cool, thereby retaining the pattern.

U.S. Pat. No. 6,777,706 discloses an optical device that comprises an optical waveguide. The optical waveguide comprises an organic semiconductive material that includes a substantially uniform dispersion of light transmissive nanoparticles. The presence of the nanoparticles influences the refractive index of the organic layer. The organic material is a polymer material. The nanoparticles may be of a metallic material.

U.S. Pat. No. 7,072,565 also discloses an optical waveguide that is made of nanoparticle composite materials.

What has been used in optical circuits may be similarly applied in simplifying design and manufacturing of transmission lines, transmission line transformers, etc. in radio frequency (RF) and/or microwave circuits. Potentially, very high frequency circuit design may be based on principles of these dielectro-magnetic waveguides.

SUMMARY OF THE INVENTION

An objective of the present disclosure is to teach fabrication of a transmission line of predetermined impedance. This may be achieved by locally altering the magnetic property distribution of a magnetic nanoparticle composite using laser heating and an external magnetic field.

According to a first aspect, a method is provided. The method comprises applying an external magnetic field on a composite comprising particles dispersed in a matrix, and orienting the particles by their easy axes in a selected area of the composite by liquefying and then solidifying the matrix at the selected area.

In the method, the particles may be crystallite particles with longest dimension of less than 100 m. The crystallite particles may be paramagnetic crystallite particles. The paramagnetic crystallite particles may be superparamagnetic crystallite particles with longest dimension of less than 20 nm. The superparamagnetic crystallite particles may be crystallite particles of one of the following: iron, cobalt, nickel, an alloy containing iron, an oxide of iron.

In the method, the matrix may be a polymeric material, and the composite is formed by coating a surfactant on surfaces of the particles, dissolving the matrix in a solvent, mixing the particles and the matrix solution, and evaporating the solvent to form a predetermined shape. The polymeric material may be a thermoplastic polymer, a thermosetting polymer or an elastomer.

Alternatively in the method, the matrix may be a thermoplastic polymer, and the composite is formed by coating a surfactant on surfaces of the particles, melting the matrix, mixing the particles into the molten matrix, and casting the molten matrix into a predetermined shape.

In the method, the liquefying of the matrix may comprise using a laser beam to heat the selected area so that liquefaction occurs in said area.

The method may further comprise randomizing the oriented particles in the selected area of the composite by liquefying and then solidifying the matrix at the selected area with the absence of the external magnetic field.

According to a second aspect, a composite comprising particles dispersed in a matrix is provided. The particles are oriented by their easy axes in a selected area of the composite by liquefying and then solidifying the matrix at the selected area while applying an external magnetic field on the composite.

In the composite, the particles may be crystallite particles with longest dimension of less than 100 nm. The crystallite particles may be paramagnetic crystallite particles. The paramagnetic crystallite particles may be superparamagnetic crystallite particles with longest dimension of less than 20 nm. The superparamagnetic crystallite particles may be crystallite particles of one of the following: iron, cobalt, nickel, an alloy containing iron, an oxide of iron.

In the composite, the matrix may be a polymeric material, and the composite is formed by coating a surfactant on surfaces of the particles, dissolving the matrix in a solvent, mixing the particles and the matrix solution, and evaporating the solvent to form a predetermined shape. The polymeric material may be a thermoplastic polymer, a thermosetting polymer or an elastomer.

Alternatively in the composite, the matrix may be a thermoplastic polymer, and the composite is formed by coating a surfactant on surfaces of the particles, melting the matrix, mixing the particles into the molten matrix, and casting the molten matrix into a predetermined shape.

In the composite, the liquefying of the matrix may comprise using a laser beam to heat the selected area so that liquefaction occurs in that area.

According to a third aspect, a transmission line component for conducting radio and microwave frequency electromagnetic waves is provided. The transmission line component comprises a dielectric medium. The dielectric medium is a composite comprising particles dispersed in a matrix.

In the transmission line component, the particles may be oriented by their easy axes in a selected area of the composite by liquefying and then solidifying the matrix at the selected area while applying an external magnetic field on the composite.

In the transmission line component, characteristic impedance of the dielectric medium may be adjusted locally by orientating the particles by their easy axes in selected areas of the composite by liquefying and then solidifying the matrix at the selected areas while applying an external magnetic field on the composite.

In the transmission line component, the particles may be crystallite particles with longest dimension of less than 100 nm. The crystallite particles may be paramagnetic crystallite particles. The paramagnetic crystallite particles may be superparamagnetic crystallite particles with longest dimension of less than 20 nm. The superparamagnetic crystallite particles may be crystallite particles of one of the following: iron, cobalt, nickel, an alloy containing iron, an oxide of iron.

In the transmission line component, the matrix may be a polymeric material, and the composite is formed by coating a surfactant on surfaces of the particles, dissolving the matrix in a solvent, mixing the particles and the matrix solution, and evaporating the solvent to form a predetermined shape. The polymeric material may be a thermoplastic polymer, a thermosetting polymer or an elastomer.

Alternatively in the transmission line component, the matrix may be a thermoplastic polymer, and the composite is formed by coating a surfactant on surfaces of the particles, melting the matrix, mixing the particles into the molten matrix, and casting the molten matrix into a predetermined shape.

In the transmission line component, the liquefying of the matrix may comprise using a laser beam to heat the selected area so that liquefaction occurs in said area.

The transmission line component may be a transmission line transformer having a characteristic impedance that is determined by the orientation of the particles in said selected area.

The transmission line component may be a waveguide having a magnetic permeability that is determined by the orientation of the particles in said selected area.

In the transmission line component, the matrix may be a conductive polymeric material, and the selected area may be an elongated area in which particles are oriented in a predetermined direction.

In the transmission line component, the matrix may be a non-conductive polymeric material, the selected area may be an elongated area in which particles are oriented in a predetermined direction, and the composite is disposed between a first and a second conductive plates.

BRIEF DESCRIPTION OF THE DRAWINGS

The above and other objects, features and advantages of the invention will become apparent from a consideration of the subsequent detailed description presented in connection with accompanying drawings, in which:

FIG. 1(*b*) is a schematic illustration of a magnetic nanoparticle composite comprising magnetic nanoparticles dispersed in a matrix;

FIG. 3(*b*) shows schematically a transmission line, in which the center strip is the aligned magnetic nanoparticles in the composite;

FIG. 4(*b*) shows the same composite after aligning the nanoparticles, which has a different magnetic permeability $\mu'$;

FIG. 5(*b*) shows a waveguide with smoothly varying width and permeability $\mu$; and FIG. 5(*c*) shows a multi-section transmission line transformer according to the present disclosure, which has a fixed width and a varying permeability $\mu$ values.

DETAILED DESCRIPTION

Figure 1A:
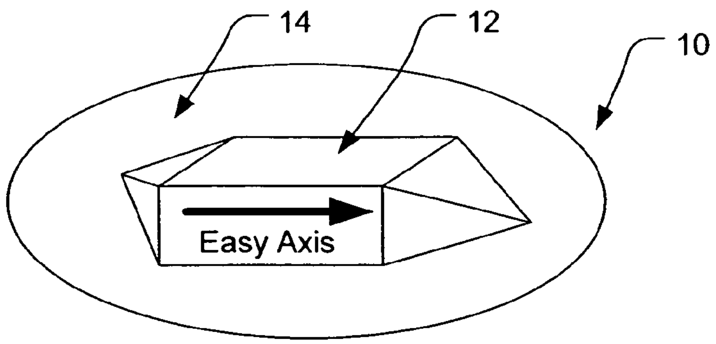
FIG. 1(*a*) is a schematic illustration of a magnetic nanocrystallite which is surrounded by a layer of surfactant.

In this application, a composite material, as defined above, with nanoscale particles (small particles with at least one dimension less than 100 nm, including nanopowder, nanocluster, nanocrystal, etc.) distributed in a solid matrix is called a nanoparticle composite. If the nanoparticles are made of a magnetic material, the composite is called a magnetic nanoparticle composite. The teachings hereof are based on the idea that certain magnetic properties of a suitably constructed magnetic nanoparticle composite can be locally fine-tuned by using external forces such as a combination of laser heating and an external magnetic field. In certain matrix materials, the modification can be permanently maintained, so that the composite has a spatial magnetic property distribution that is tailored to a specific application.

An objective hereof is to teach fabrication of a transmission line of a predetermined impedance and electrical length by using a suitably constructed magnetic nanoparticle composite. Although embodiments shown are mainly applied to the design and construction of transmission lines, including waveguides, for RF and/or microwave energy transmission, the same principle can be applied to other suitable applications and the teachings hereof are broadly applicable to these other applications as well.

A magnetic nanoparticle composite is formed by uniformly dispersing nanometer-sized crystallite particles in a matrix material. The matrix material may be an insulating material or a conductive material. Polymeric materials are advantageous for use as the matrix. Conventional polymers are insulating materials, but polymers may be conductive, and they are also advantageous for the purposes of the particular embodiments shown. Basically any polymer (thermoplastic polymer, thermosetting polymer or even elastomer) can be used as matrix. Examples of thermoplastic polymers with good dielectric properties include polyethylene, polystyrene, syndiotactic polystyrene, polypropylene, cyclic olefin copolymer or fluoropolymers. Examples of thermosetting polymers include epoxy, polyimide, etc.

Magnetic nanocrystallite particles (or nanoparticles in short) suitable for the embodiments are paramagnetic. In such embodiments, the paramagnetic nanoparticles should not exhibit ferromagnetic properties at a temperature range required for preparing the composite. Therefore, during the preparation of the composite, these nanoparticles do not cluster or align with each other and they are easily dispersed in the matrix material.

The paramagnetic nanoparticles can be for example either super-paramagnetic nanoparticles, which are paramagnetic at nearly all temperatures, or paramagnetic nanoparticles with a relatively low Curie temperature (i.e. the Curie point is below the ambient temperature).

Superparamagnetism occurs when the material is composed of very small crystallites (less than 20 nm, preferably 1-10 nm). Even when the temperature is below the Curie or Neel temperature, the thermal energy is sufficient to change the direction of magnetization of the entire crystallite. The resulting fluctuations in the direction of magnetization cause the overall magnetic field to be zero. Thus the material behaves in a manner similar to paramagnetism, except that instead of each individual atom being independently influenced by an external magnetic field, the magnetic moment of the entire crystallite tends to align with a magnetic field.

The energy required to change the direction of magnetization of a crystallite is called the crystalline anisotropy energy and depends both on the material properties and the crystallite size. As the crystallite size decreases, so does the crystalline anisotropy energy, resulting in a decrease in the temperature at which the material becomes superparamagnetic.

Figure 1B:
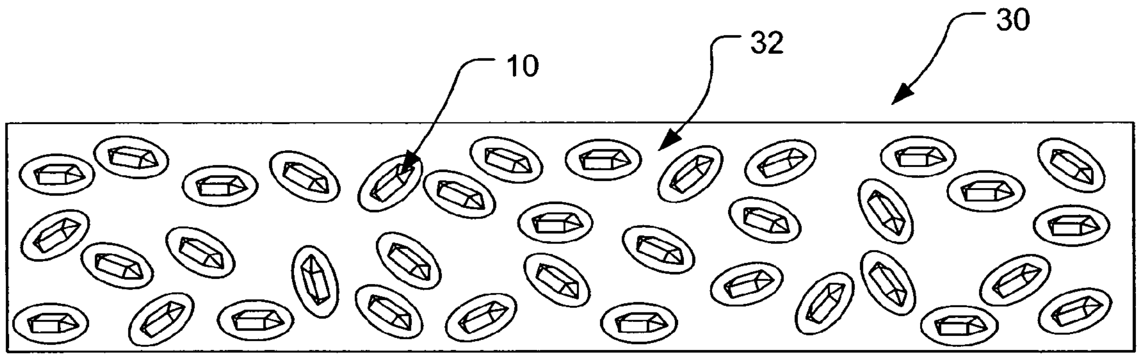

Typical superparamagnetic nanoparticles include metals like Fe, Co and Ni, alloys like FePt, oxides like $Fe_3O_4$, etc. As shown in FIG. 1(*a*), for the embodiments, a superparamagnetic nanocrystallite 12 is coated with a layer of surfactant 14 to form a coated nanoparticle 10. As shown in FIG. 1 (*b*), the surfactant-coated nanoparticles 10 are uniformly dispersed in a polymer matrix 32 as mentioned above to form a magnetic nanoparticle composite 30. The dispersion of the nanoparticles in the polymer matrix can be performed by various conventional methods known in the art. For example, the composite can be made using solution or melt mixing techniques. For thermosetting polymers, solution method is suitable. A thermosetting polymer is dissolved in a solvent and mixed with nanoparticles. Composite thin films are formed by casting or spin coating and traditional curing by heat or ultraviolet light. For thermoplastic polymers, solution mixing is also suitable for produce the composite. Mixing with low viscosity solvent results in good dispersion of nanopatricles within the polymer. Films can be formed either by casting or spin coating (solvent evaporated away). Thin films can be made also by e.g. Langmuir-Blodgett technique or layer-by-layer deposition directly from the solution.

Alternatively, as the nanoparticles are coated with a surfactant, they can be mixed well with molten thermoplastic polymers. Standard melt mixing techniques (e.g. twin-screw extruder or single-screw extruder with mixing elements) and plastic processing methods (extrusion, injection or compression molding) can be used. This method may be more favorable for high volume productions.

As the composite material is solidified (which means for thermoplastic polymer to cool down to below its glass transition temperature, or for the thermosetting polymer to be cured) the polymer matrix becomes stiff and the magnetic nanoparticles are bound to the matrix, unable to move or rotate (see FIG. 1(*b*)).

Although the composite is preferably formed in a flat-sheet shape such as a thin film, other geometric shapes can also be considered according to the teachings hereof. In addition to above-mentioned methods for forming the flat-sheet shaped composite, other forming methods may also be considered by persons skilled in the art.

The weight or volume fraction of the nanoparticles in the matrix is not limited, and it should be determined by specific applications to produce desired permeability values. For example, anything from a few percent up to a close packing of particles as the surfactant layer and polymer allow to keep the particles separated may be considered.

Suitable nanocrystallite particles may be characterized in that each nanoparticle has a so-called easy axis (as illustrated in FIG. 1(*a*)). The easy axis is an energetically favorable direction of spontaneous magnetization in a magnetic material. The easy axis is determined by various factors, including magnetocrystalline anisotropy and shape anisotropy. The two opposite directions along the easy axis are usually equivalent, and the actual direction of the magnetization can be either of them.

In the as-formed composite, the easy axes of the nanoparticles are randomly oriented and nanoparticles are confined by the matrix. Therefore, the net magnetization of the composite is zero. According to the teachings hereof, the formed composite is further processed to allow for a local alignment of the magnet nanoparticles according to a predetermined pattern (the process is referred to as "patterning" hereinafter). As the result, the nanoparticles inside the pattern are substantially aligned in their easy axes and the nanoparticles outside the pattern remain randomly oriented.

Figure 2:
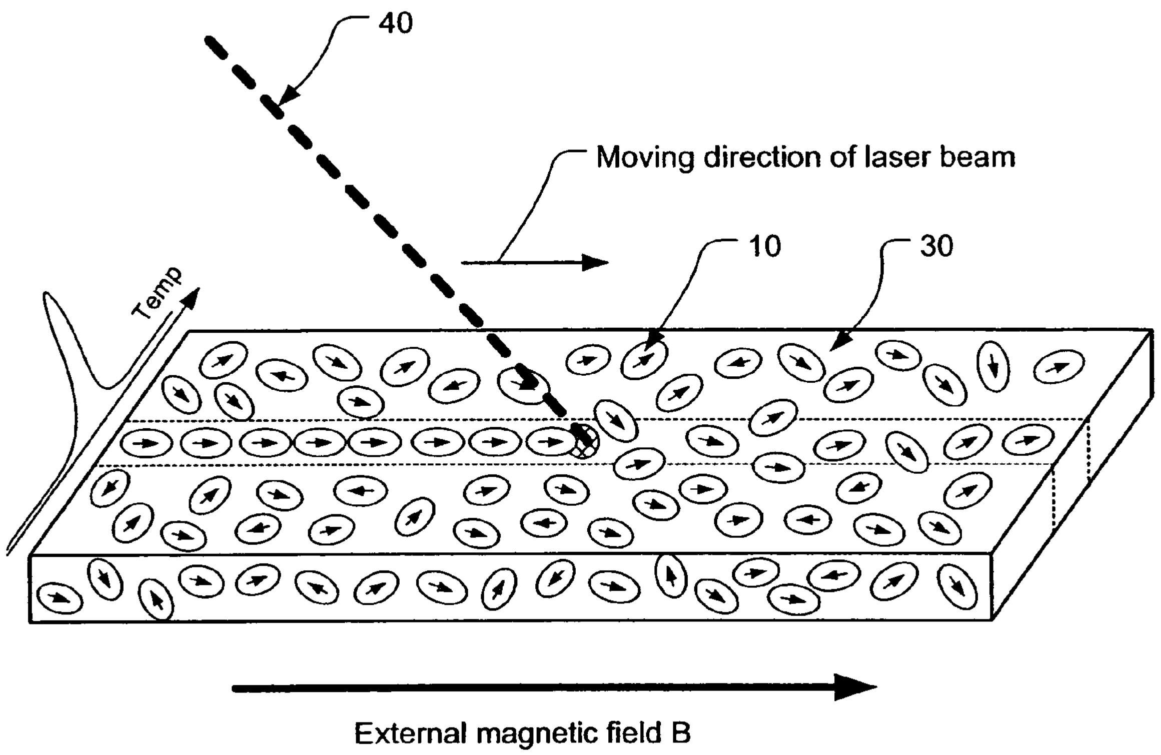
FIG. 2 is a schematic illustration of an exemplary process for aligning the easy axes of nanoparticles in a magnetic nanoparticle composite, according to the present disclosure.

A method for forming an aligned magnetic nanoparticle pattern in the composite is by heating locally, along the predetermined pattern, using a finely focused laser beam or other suitable heat sources. Selection of a heat source depends on the shape of the pattern, and could take many different forms. Therefore, it should be understood that there are other ways to provide the “patterning” and the technique shown is merely exemplary. FIG. 2 shows an example in which a laser beam 40 is moving along a line on the composite 30 and the spot hit by the laser has a higher temperature than the surrounding areas. An external magnetic field B is applied while the composite is heated locally by the laser beam. Along the line that the laser beam moves, the polymer matrix material is locally softened or liquefied. Above a certain temperature, the nanoparticles 10 in the softened region are able to move around and/or rotate. The external magnetic field applied on the composite influences the particles’ direction of rotation, so that their easy axes are substantially aligned in a relation with the magnetic field B. As the result of the alignment, the average particle-to-particle distance may decrease and nanoparticles may even become nearly connected to each other along the line.

The heating laser beam may be precisely adjusted so that the polymer matrix is liquefied locally, enough to allow the rotation of nanoparticles. Typically for amorphous thermoplastic polymers and thermosetting polymers, heating the polymer matrix slightly above its glass transition temperature is sufficient. However, for some highly crystalline thermoplastic polymers, local melting might be required. Even more precisely, the laser beam or an alternative heat source may be controllably applied in such a way that only the surfactant layer around the nanoparticles is liquefied to allow only rotation but not linear movement of the nanoparticles.

The matrix material cools down quickly after the heat source is removed. The external magnetic field is applied until the matrix completely solidifies again. As a result, the magnetic nanoparticle composite now has a patterned microstructure. The pattern may contain several lines, parallel or in different angles, depending on the design. The pattern can be made in several steps in which the directions of the external magnetic field and the laser heating line are carefully matched to ensue that the nanoparticles are oriented in a desired direction.

The direction of the orientation depends on particular applications. For example, if the propagation mode of the electromagnetic wave is a transverse electromagnetic mode (TEM), the nanoparticles should be oriented with their easy axes such that the current is parallel to the line and the magnetic field is perpendicular to the line, thus orienting the easy axes of the nanoparticles perpendicular to the line would have more effect than other directions.

The patterned magnetic nanoparticle component can be used in fabricating transmission line components for directing RF or microwave frequency electromagnetic waves.

In electromagnetism, permeability is the degree of magnetization of a material that responds linearly to an applied magnetic field. Magnetic permeability is represented by the Greek letter $\mu$. Basically, permeability of the composite depends on the density of the particles in the composite, the orientation of the particles, and the material choice. As can be seen above, the magnetic permeability of the composite at a certain location depends on the net easy axis of the magnetic nanoparticles at the location. At unpatterned locations, the net magnetization is zero. At the patterned locations the net axis of the nanoparticles is no longer random and the net magnetization is not zero. Therefore, the magnetic permeability at the patterned locations is not the same as that of the unpatterned locations. With the fine-tuning of the nanoparticle orientation the local changes in the permeability is made.

Patterning the magnetic nanoparticle composite locally results in a desired spatial distribution of the permeability. The patterned magnetic nanoparticle composite can be used as the dielectric medium for transmission of electromagnetic energy or local adjustment of RF properties of distributed elements such as transmission lines or waveguides.

Figure 3A:
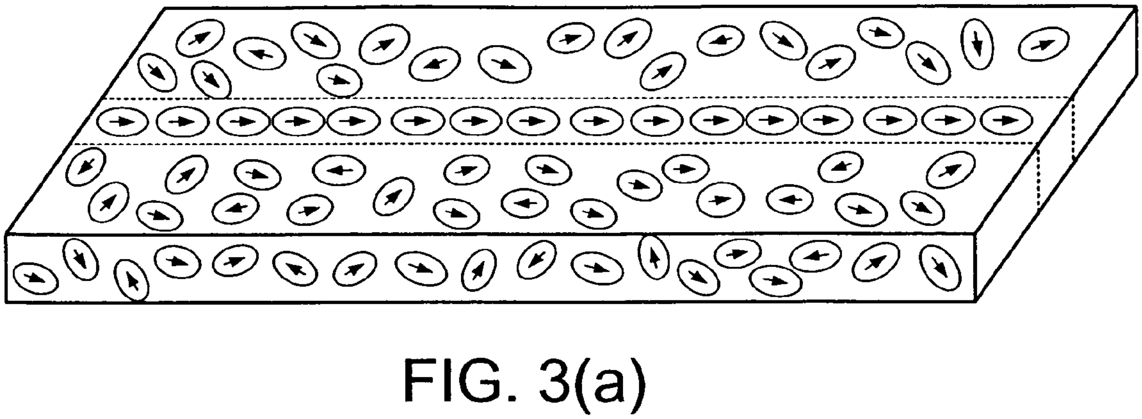
FIG. 3(*a*) shows schematically a magnetic nanoparticle composite microstructure after the process of FIG. 2.
Figure 3B:
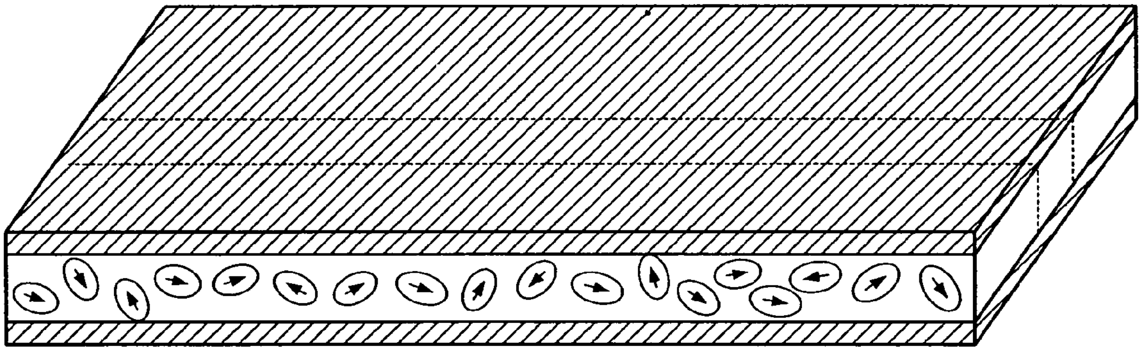

A schematic drawing of a stripline according to the present disclosure is shown in FIG. 3. FIG. 3(*a*) shows a piece of magnetic nanoparticle composite prepared according to the above-mentioned process which results in a line of aligned nanoparticles in the composite. FIG. 3(*b*) shows a stripline in which the magnetic nanoparticle composite of FIG. 3(*a*), used as the dielectric medium, is sandwiched between two conductive plates. The aligned line of the nanoparticles plays the role of the central conductor in the stripline.

If the polymer matrix is conductive (consisting of any inherently conductive polymer), the conductive plates are not needed. The magnetic nanoparticle composite is patterned in a similar way as described above and the stripline can be made entirely with the composite material.

Figure 4A:
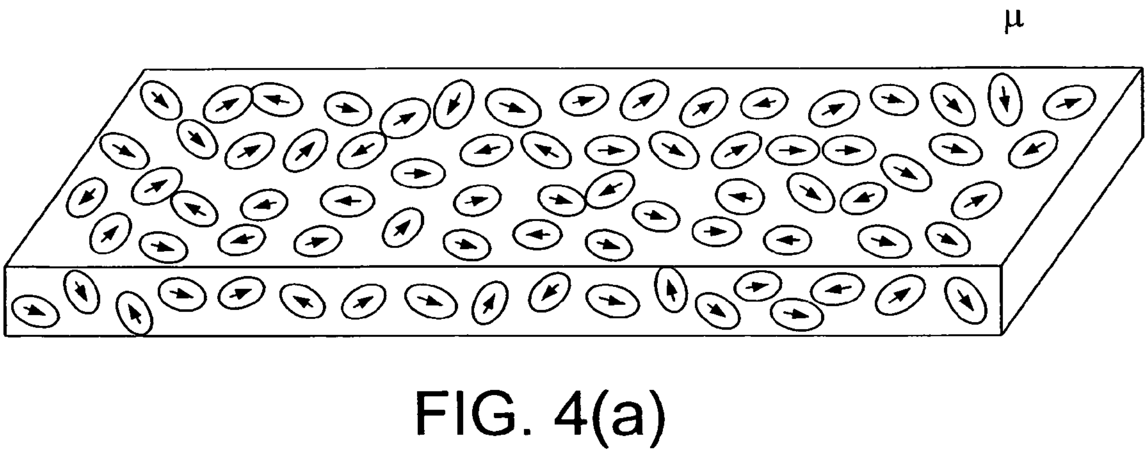
FIG. 4(*a*) shows an as-formed magnetic nanoparticle composite, which has a magnetic permeability $\mu$.
Figure 4B:
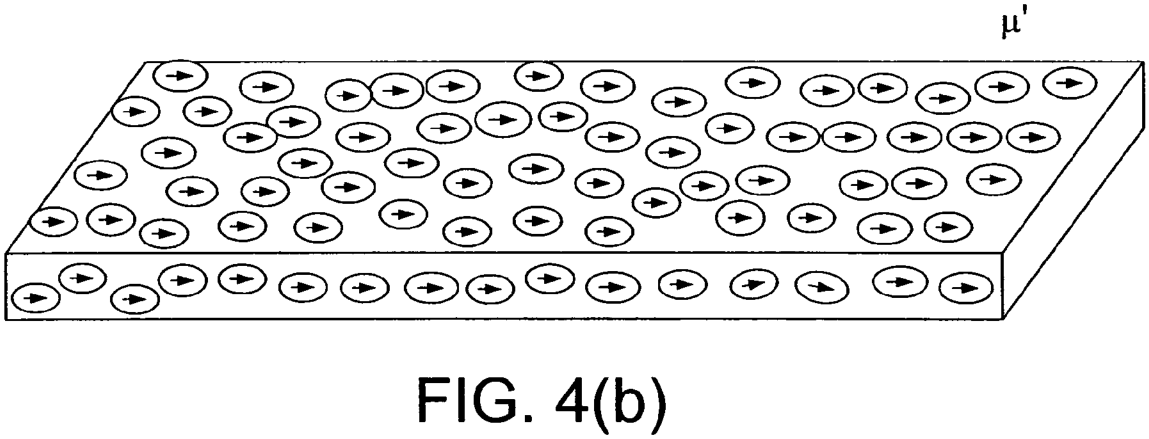

Referring now to FIG. 4, an as-formed magnetic nanoparticle composite sheet (a) has a permeability $\mu$ which is determined by the material of the choice and the density of the nanoparticles. Such a sheet of composite is subject to the process according to the present disclosure and, as the result, the nanoparticles are partially or entirely oriented in some or all of the locations depending on the process conditions. Thus, after the process, the permeability of the composite changes to $\mu'$ (b). Therefore, even though the dimensions of the composite remain the same, the magnetic properties of the composite are different. This feature can be used to simplify the design of the transmission line components.

A conduit of electromagnetic energy (i.e. a waveguide) can be formed by locally tailoring the electromagnetic environment (permeability) of the wave conducting medium. Thus there is no need for any extra cables for directing the electromagnetic wave. Confinement in a waveguide so created can be estimated by the $TM_{01}$ mode cut-off frequency of a circular waveguide:

$$F=c\times 2.4/r$$

(where c is speed of light, r is radius of the waveguide)

This shows that the waveguides need to have a dimension in the range of three times the wavelength. Dimension wise, the present invention is very useful in the THz frequency range where the wavelength is from 0.3 to 0.1 mm (frequency 1-3 THz).

The fine-tuning of the material properties as suggested by the teachings hereof can be used for changing impedance levels of a microstrip or other transmission line. Local, tunable magnetic property change is equivalent to changing the width of the microstripline and thus allows for the same size “wiring” with changing and variable microstrip impedance to be illustrated below. Gradient in the permeability will cause the electromagnetic wave to reflect and will thus lead to a waveguide as in other transmission lines. If the net easy axes of the nanoparticles are partially aligned and the degree and/or orientation of the alignment varies gradually from location to location, the composite material can be used as a transformer, since the electromagnetic wave properties will depend on the environment’s permeability.

Very localized tuning of magnetic properties allows for the fabrication of transmission line components where the conductor width is not changed but instead the material properties of the environment of conductor are tuned. This leads to a design domain where only material properties are changed instead of wiring structure. This could be very beneficial in circuits where, for example, a 50 ohm input is matched to much lower impedance at very high frequencies. This also allows for the stripline component sizes (width) to be of the same order as that of the very small component dies that are used at microwave frequencies.

Figure 5A:
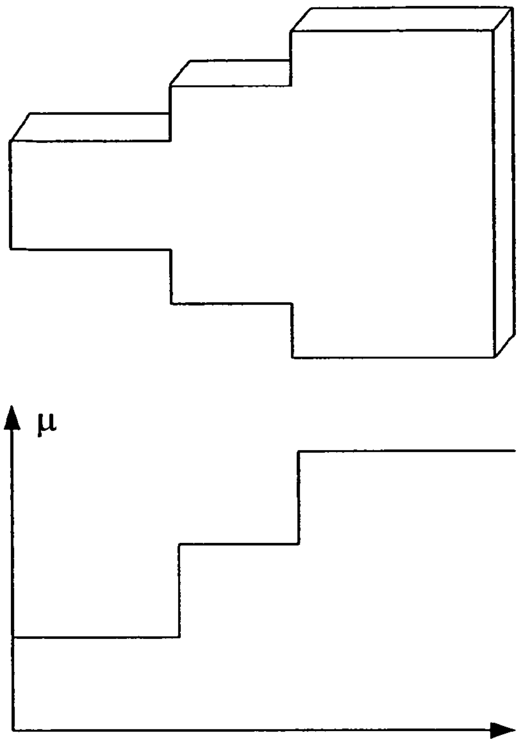
FIG. 5(*a*) shows a conventional multi-section transmission line transformer having stepwise widths and changes of the permeability $\mu$.
Figure 5B:
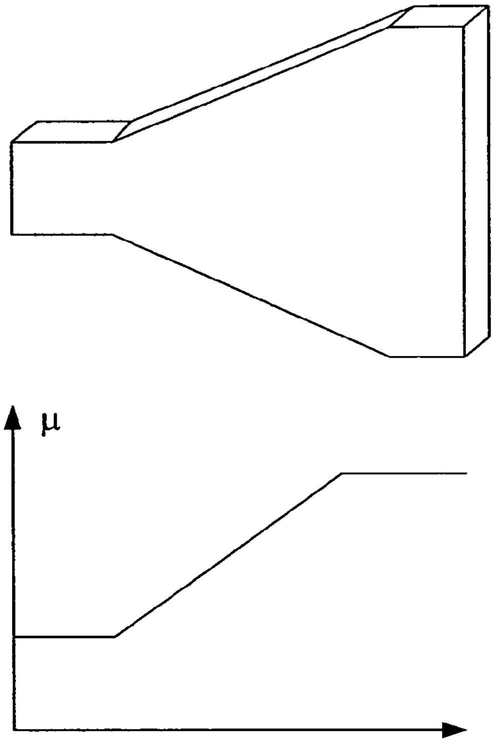
Figure 5C:
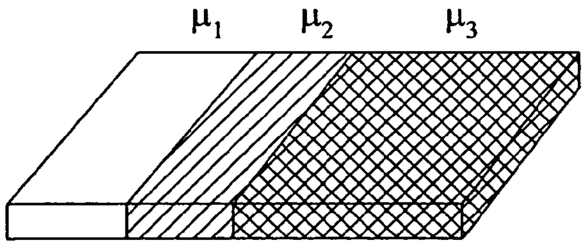

FIG. 5(*a*) shows a conventional multi-section transformer with three different widths. Each section has a permeability value that is determined by the width of the dielectric medium and each section thus has a characteristic impedance. FIG. 5(*b*) is a conventional waveguide with smoothly varying width, which corresponds to a smoothly varying permeability. FIG. 5(*c*) is a multi-section transformer according to the teachings hereof. By locally tuning the nanoparticle orientation, different sections of the composite have different permeability values $\mu_1$, $\mu_2$ and $\mu_3$, which is equivalent to having three different characteristic impedance values. A waveguide with magnetic properties similar to that of FIG. 5(*b*) but with fixed width can also be fabricated by the composite and the process of the present invention.

According to the embodiments, the local microstructure change is permanently maintained under normal operation conditions. With a further process, the change may be reversed. In order to reverse the change, for example re-randomize the particle orientation, simply bringing the composite to a liquefaction temperature without applying external magnetic field.

In summary, the present disclosure shows the following advantages among others:

(1) A transmission circuit can be made without thin wires, cables or strips. It can be composed of only plates and the composite material. If the matrix of the composite is conductive (e.g. made with conductive polymers), the circuit can be made with only the composite. For example, in a printed wiring board, the board can be replaced by a sheet made of the magnetic nanoparticle composite material and some or all of formerly required extra wiring can be omitted.

(2) Physical width of the wiring can remain the same, only material properties change underneath (or inside). This can be beneficial in very high frequency, low impedance circuits where physical sizes of the transmission line and the high frequency component need to match.

(3) Tuning of material properties of the circuit leads to reversible ways of adjusting circuitry without using adjustable components and thus enables a design-testing-tuning-retesting cycles that are very fast for designing the circuit.

It is to be understood that the above-described arrangements are only illustrative of the applications of the principles of the teachings hereof. In particular, it should be understood that although transmission line embodiments have been shown, the teachings hereof are not restricted to transmission lines. The present disclosure has been disclosed in reference to specific examples. Numerous modifications and alternative arrangements may be devised by those skilled in the art without departing from the scope of the teachings hereof.

What is claimed is:

1. A method, comprising:

coating a surfactant on surfaces of particles;

applying an external magnetic field on a solidified composite comprising the particles dispersed in a matrix; and orienting particles by their easy axes in a selected area of the composite by liquefying the selected area of the matrix and then solidifying the matrix at the selected area to form a path for directing the transmission of electromagnetic waves, wherein the path comprises a waveguide configured to transmit in the 1 to 3 terahertz (THz) range.

2. The method of claim 1, wherein the particles are crystallite particles with longest dimension of less than 100 nm.

3. The method of claim 2, wherein the crystallite particles are paramagnetic crystallite particles.

4. The method of claim 3, wherein the paramagnetic crystallite particles are superparamagnetic crystallite particles with longest dimension of less than 20 nm.

5. The method of claim 4, wherein the superparamagnetic crystallite particles are crystallite particles of one of the following: iron, cobalt, nickel, an alloy containing iron, an oxide of iron.

6. The method of claim 1, wherein the matrix is a polymeric material, and wherein the composite is formed by:

coating a surfactant on surfaces of the particles, dissolving the matrix in a solvent, mixing the particles and the matrix solution, and evaporating the solvent to form a predetermined shape.

7. The method of claim 6, wherein the polymeric material is a thermoplastic polymer, a thermosetting polymer or an elastomer.

8. The method of claim 1, wherein the matrix is a thermoplastic polymer, and wherein the composite is formed by:

coating a surfactant on surfaces of the particles, melting the matrix, mixing the particles into the molten matrix, and casting the molten matrix into a predetermined shape.

9. The method of claim 1, wherein the liquefying of the matrix comprises using a laser beam to heat the selected area so that liquefaction occurs in said area.

10. The method of claim 1, further comprising:

randomizing the oriented particles in the selected area of the composite by liquefying and then solidifying the matrix at the selected area with the absence of the external magnetic field.

* * * * *